(12) United States Patent
Yoo et al.

(10) Patent No.: US 9,199,377 B2
(45) Date of Patent: *Dec. 1, 2015

(54) METHOD AND SYSTEM FOR EXTRACTING INTENDED TORQUE FOR WEARABLE ROBOT

(71) Applicant: Hyundai Motor Company, Seoul (KR)

(72) Inventors: Su Jung Yoo, Incheon (KR); Woo Sung Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 166 days.

This patent is subject to a terminal disclaimer.

(21) Appl. No.: 13/846,853

(22) Filed: Mar. 18, 2013

(65) Prior Publication Data

US 2014/0172170 A1    Jun. 19, 2014

(30) Foreign Application Priority Data

Dec. 17, 2012 (KR) .................. 10-2012-0147914

(51) Int. Cl.
    *B25J 9/16* (2006.01)
(52) U.S. Cl.
    CPC .................... *B25J 9/1633* (2013.01)
(58) Field of Classification Search
    CPC ...................... B25J 9/1633; Y10S 901/09
    USPC ........... 700/245–264; 601/5, 33–35; 600/595;
                                                    318/568.12
    See application file for complete search history.

(56) References Cited

U.S. PATENT DOCUMENTS

| 7,857,774 | B2* | 12/2010 | Sankai ............................. 601/5 |
| 7,865,269 | B2  | 1/2011  | Prisco et al. |
| 8,142,371 | B2* | 3/2012  | Ikeuchi et al. .................... 601/5 |
| 8,181,520 | B2* | 5/2012  | Kadota et al. .............. 73/379.01 |

(Continued)

FOREIGN PATENT DOCUMENTS

| JP | 2004277039 A | 10/2004 |
| JP | 2008238338 A | 10/2008 |

(Continued)

OTHER PUBLICATIONS

Kwag Sik Eom et al.; Design of Force Estimator Based on Disturbance Observer; Trans. KIEE. vol. 48A, No. 9, Sep. 1999, pp. 1140-1146.

(Continued)

*Primary Examiner* — Dalena Tran
(74) *Attorney, Agent, or Firm* — McDermott Will & Emery LLP

(57) ABSTRACT

Provided are a method and system for extracting intended torque for a wearable robot. The method makes use of an angle or angular velocity of rotation of a motor driving a joint and an angle or angular velocity of rotation of a link connected to the joint, and includes a friction outputting process of outputting an estimated value of friction torque from the angle of rotation of the motor, a motor torque calculating process of calculating motor torque from the angular velocity of rotation of the motor, a link rotation calculating process of calculating the angular velocity of rotation of the link, and an intended torque calculating process of substituting the motor torque and the angular velocity of rotation of the link into a disturbance observer, and calculating an estimated value of the intended torque applied by a wearer.

6 Claims, 3 Drawing Sheets

(56) References Cited

U.S. PATENT DOCUMENTS

| | | | |
|---|---|---|---|
| 8,347,710 B2* | 1/2013 | Scott et al. | 73/379.01 |
| 2008/0234608 A1* | 9/2008 | Sankai | 601/5 |
| 2008/0255488 A1* | 10/2008 | Agrawal et al. | 602/23 |
| 2014/0046483 A1* | 2/2014 | Oaki | 700/253 |

FOREIGN PATENT DOCUMENTS

| KR | 1020060045541 A | 5/2006 |
|---|---|---|
| KR | 10-2008-0079590 | 9/2008 |
| KR | 1020110092890 A | 8/2011 |
| KR | 1020120064940 A | 6/2012 |

OTHER PUBLICATIONS

Korean Office Action issued in Application No. 10-2012-0147914 dated Nov. 21, 2013.

* cited by examiner

METHOD AND SYSTEM FOR EXTRACTING INTENDED TORQUE FOR WEARABLE ROBOT

CROSS-REFERENCE TO RELATED APPLICATION

This application claims under 35 U.S.C. §119(a) the benefit of priority to Korean Patent Application No. 10-2012-0147914, filed Dec. 17, 2012, the entire contents of which are incorporated herein by reference.

TECHNICAL FIELD

The present disclosure relates to a method and system for extracting intended torque for a wearable robot, which calculate the intended torque of a wearer using a disturbance observer, and friction compensation using an open-loop function.

BACKGROUND

As high-load work is increasingly common in industrial fields, there is an increased need to study measures that allow a load applied to human joints to be reduced for the increased convenience of workers. According to this demand, a wearable robot which a worker wears and moves has been proposed as one such measure. The present disclosure proposes a technique for extracting intended torque of a wearer so as to allow the wearable robot to accurately move according to the intent of the wearer.

In a method and apparatus for compensating a stick motion generated at a quadrant changing position in numerical control machine tools disclosed in Korean Unexamined Patent Application Publication No. 10-2008-0079590, a real position estimator 21 estimates a real position of a movable body corresponding to a position instruction signal to generate a real position signal. A differentiator 22 differentiates the real position signal to obtain a speed signal. Then, an integrator 24 integrates the speed signal, thereby generating a displacement signal from a position at which a moving direction of the movable body is reversed. An absolute value calculator 25 obtains an absolute value of the displacement signal. A friction characteristic estimator 26 obtains a rate of change of displacement of friction force or friction torque. A multiplier 27 multiplies the rate of change of the displacement by the speed signal, and obtains a rate of change of time. An integrator 28 integrates the rate of change of time, and estimates the friction force or the friction torque.

However, in spite of this measure, additional measures are still required for realizing proper movement corresponding to the intent of the wearer by obtaining friction in real driving in real time, and by compensating a driver with the obtained friction.

Further, a force-torque sensor is generally attached to the wearable robot in order to measure torque applied by a user. This sensor has an influence on an increase in weight of a mechanism as well as in price.

Thus, since the force-torque sensor is used to calculate the wearer-intended torque, a way to effectively calculate the wearer-intended torque without using this expensive sensor is required.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art. The present disclosure proposes a method and system for extracting intended torque for a wearable robot, calculating the intended torque of a wearer using a disturbance observer, and friction compensation using an open-loop function In order to achieve the above objects, according to an aspect of the present disclosure, there is provided a system for extracting intended torque for a wearable robot, which includes a motor sensor measuring an angle or angular velocity of rotation of a motor driving a joint, a link sensor measuring an angle or angular velocity of rotation of a link connected to the joint, and a controller configured to adopt the angular velocity of rotation of the motor as an input and an estimated value of frictional torque as an output, substituting motor torque calculated from the angular velocity of rotation of the motor and the angular velocity of rotation of the link into a disturbance observer, and calculating an estimated value of the intended torque applied by a wearer.

According to another aspect of the present disclosure, there is provided a method of extracting intended torque for a wearable robot, in which an angle or angular velocity of rotation of a motor driving a joint and an angle or angular velocity of rotation of a link connected to the joint are used. The method includes a friction outputting process of outputting an estimated value of friction torque from the angle of rotation of the motor, a motor torque calculating process of calculating motor torque from the angular velocity of rotation of the motor, a link rotation calculating process of calculating the angular velocity of rotation of the link, and an intended torque calculating process of substituting the motor torque and the angular velocity of rotation of the link into a disturbance observer, and calculating an estimated value of the intended torque applied by a wearer.

In certain embodiments of the present disclosure, the motor torque calculating process includes adding a component, which is obtained by removing the angle of rotation of the link from the angle of rotation of the motor and by performing proportional control on the removed result, to a component, which is obtained by removing sensor noise from the angular velocity of rotation of the motor and by performing differential control on the removed result, removing the intended torque estimated value from the added result, and calculating the motor torque.

Further, the intended torque calculating process may include multiplying the angular velocity of rotation of the link by an inverse function of a nominal model of the link, calculating an estimated value of the motor torque, removing the motor torque from the calculated result, passing the removed result through a Q filter, and calculating the estimated value of the intended torque.

In certain embodiments, the method further includes a motor controlling process of adding the intended torque estimated value to a demand torque, removing a friction torque estimated value from the added result, obtaining a fixed demand torque, and controlling the motor according to the fixed demand torque.

In certain embodiments, the friction outputting process may include calculating the estimated value of the friction torque using a function in which the angular velocity of rotation of the motor is set to the input and the estimated value of the friction torque is set to the output.

In addition, the function may be configured by the sum of coulomb friction torque, a product of viscosity friction torque and the angular velocity of rotation of the motor, and a product of static friction force and a signum value of the angular velocity of rotation of the motor.

According to the method and system for extracting intended torque for a wearable robot which have the above-mentioned structure, the friction of a driver is removed using an open-loop function without a separate force-torque sensor, and then the intended torque of a wearer can be extracted using a disturbance observer used for existing disturbance prediction.

BRIEF DESCRIPTION OF THE DRAWINGS

The foregoing and other features of the present disclosure will be apparent from more particular description of embodiments of the present disclosure, as illustrated in the accompanying drawings in which like reference characters may refer to the same or similar parts throughout the different views. The drawings are not necessarily to scale, emphasis instead being placed upon illustrating the principles of the embodiments of the present disclosure.

DETAILED DESCRIPTION

Hereinafter, a method and system for extracting intended torque for a wearable robot according to an exemplary embodiment of the present disclosure will be described in detail with reference to the accompanying drawings.

Figure 1:
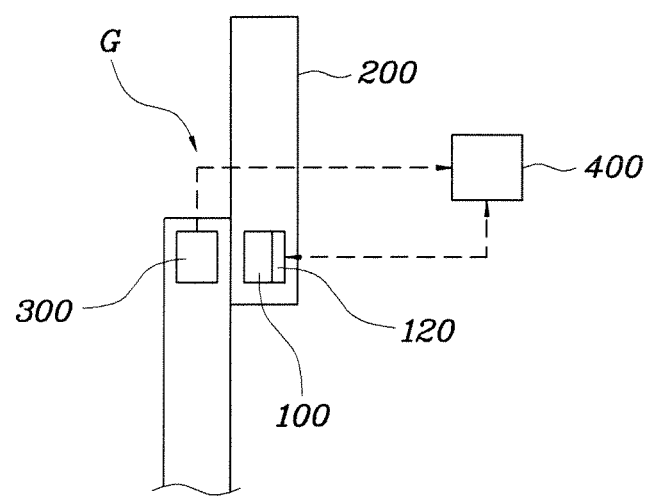
FIG. 1 is a configuration view of a system for extracting intended torque for a wearable robot in accordance with an embodiment of the present disclosure.

FIG. 1 is a configuration view of a system for extracting intended torque for a wearable robot in accordance with an embodiment of the present disclosure. The system for extracting intended torque for a wearable robot includes a motor sensor 120 for measuring an angle or angular velocity of rotation of a motor 100 driving a joint G, a link sensor 300 measuring an angle or angular velocity of rotation of a link 200 connected to the joint G, and a controller 400 having a function that adopts the angular velocity of rotation of the motor 100 as an input and an estimated value of frictional torque as an output, substituting motor torque calculated from the angular velocity of rotation of the motor 100 and the angular velocity of rotation of the link 200 into a disturbance observer, and calculating an estimated value of the intended torque applied by a wearer.

In certain embodiments, the link 200 is connected to the joint G of the robot via the motor 100. Operation of the wearer is detected by rotary encoders of the motor sensor 120 and the link sensor 300. Thus, driving of the motor 100 is controlled to compensate for friction of the joint G, and the intended torque of the wearer is detected. To detect the intended torque, the motor sensor 120, the link sensor 300, and the controller 400 are required.

Figure 2:
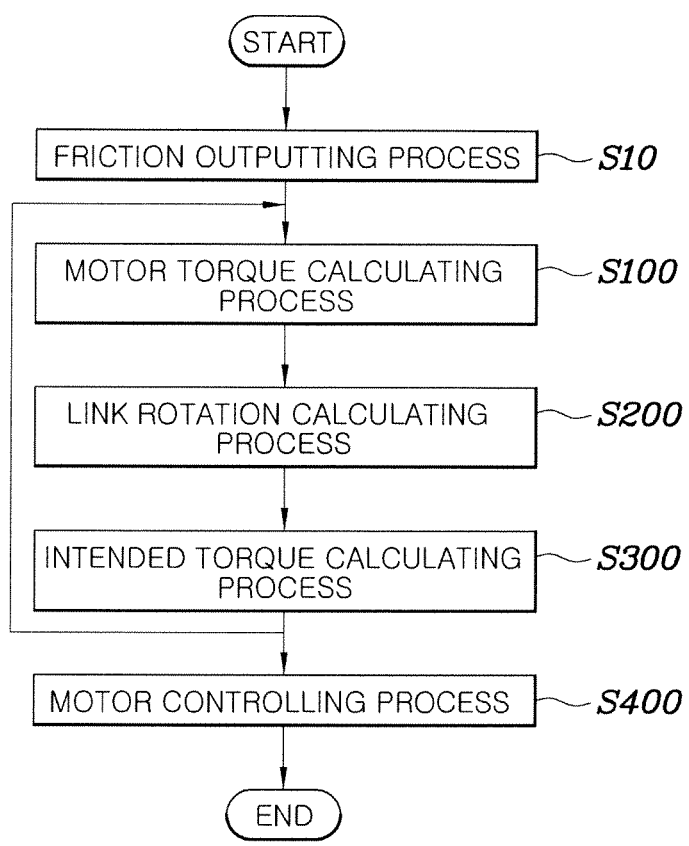
FIG. 2 is a flow chart of a method of extracting intended torque for a wearable robot in accordance with an embodiment of the present disclosure.

FIG. 2 is a flow chart of a method of extracting intended torque for a wearable robot in accordance with an embodiment of the present disclosure. The method of extracting intended torque for a wearable robot uses an angle or angular velocity of rotation of a motor driving a joint and an angle or angular velocity of rotation of a link connected to the joint, and includes a friction outputting process S10 of outputting an estimated value of friction torque from the angle of rotation of the motor, a motor torque calculating process S100 of calculating motor torque from the angular velocity of rotation of the motor, a link rotation calculating process S200 of calculating the angular velocity of rotation of the link, and an intended torque calculating process S300 of substituting the motor torque and the angular velocity of rotation of the link into a disturbance observer and calculating an estimated value of the intended torque applied by a wearer.

The motor torque calculating process S100 includes adding a component, which is obtained by removing the angle of rotation of the link from the angle of rotation of the motor and by performing proportional control on the removed result, to a component, which is obtained by removing sensor noise from the angular velocity of rotation of the motor and by performing differential control on the removed result, and removing the intended torque estimated value from the added result. Thereby, the motor torque can be calculated.

Further, the intended torque calculating process S300 includes multiplying the angular velocity of rotation of the link by an inverse function of a nominal model of the link, calculating an estimated value of the motor torque, removing the motor torque from the calculated result, and passing the removed result through a Q filter. Thereby, the estimated value of the intended torque can be calculated.

In certain embodiments, the method further includes a motor controlling process S400 of adding the intended torque estimated value to a demand torque, removing a friction torque estimated value from the added result, obtaining a fixed demand torque, and controlling the motor according to the fixed demand torque. In the friction outputting process S10, using a function in which the angular velocity of rotation of the motor is input and the estimated value of the friction torque is output, and the estimated value of the friction torque can be calculated.

In certain embodiments, the function may be configured by the sum of coulomb friction torque, a product of a viscosity friction torque and the angular velocity of rotation of the motor, and a product of a static friction force and a signum value of the angular velocity of rotation of the motor.

Figure 3:
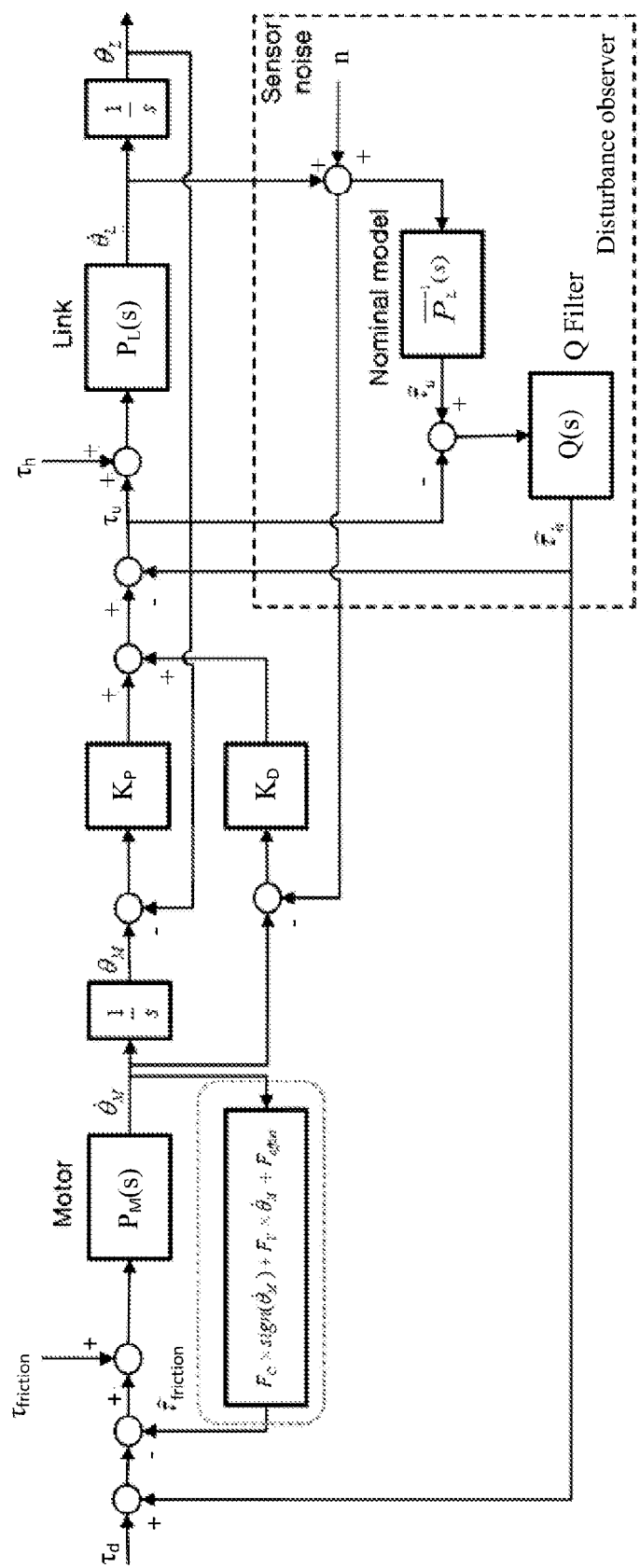
FIG. 3 is a block diagram of the method of extracting intended torque for a wearable robot in accordance with the embodiment of the present disclosure.

FIG. 3 is a block diagram of a method of extracting intended torque for a wearable robot in accordance with an embodiment of the present disclosure. The method will be described in greater detail with reference to FIG. 3.

First, the demand torque $\tau_d$ required to drive the robot by a wearer is calculated. An estimated value $\hat{\tau}$ of intended torque of the wearer is added to the demand torque $\tau_d$, and an estimated value $\hat{\tau}$ of friction torque is removed from the added result. Thereby, the final demand torque is obtained. The demand torque $\tau_d$ may be set to 0(zero) if the wearer does not lift a heavy object. In contrast, if the wearer lifts the heavy object, the demand torque $\tau_d$ may be set so as to apply necessary torque according to the situation. Further, in certain embodiments, a variety of different kinds of torque are applied for reaction of the robot during gravity compensation. Thus, the final demand torque is input to the motor under the control of current through the intent of the wearer and friction compensation.

In certain embodiments, the motor $P_M(S)$ outputs torque from the final demand torque by an instructed value. This results from intervention of the friction torque due to a physical limit. Thus, in the present disclosure, this friction torque is estimated, and the estimated value $\hat{\tau}$ is removed. Thereby the friction torque is reflected on the final demand torque.

Meanwhile, in the motor, the angle $\theta_M$ of rotation of the motor and the angular velocity $\dot{\theta}_M$ of rotation of the motor are derived according to the output. They are measured or calculated by a motor sensor. The estimated value of the friction torque can be obtained by a function expressed by $F_C + F_V \times \dot{\theta}_M + F_{offset} \times \text{sign}(\dot{\theta}_M)$. That is, the torque caused by the coulomb friction force is set to a constant. The torque caused by the viscosity friction force is multiplied by the angular velocity of rotation of the motor. The torque of the static friction force is multiplied by the signum value of the angular velocity of rotation of the motor. Then, all of them are added to calculate the estimated value of the friction torque. Thus, to calculate this function, a table in which the values of the coulomb friction force, the viscosity friction force, the static friction force with respect to the angular velocity of rotation of the motor are set to outputs should be previously provided by experiments.

The value obtained by removing the angle $\theta_L$ of rotation of the link from the angle $\theta_M$ of rotation of the motor and by performing the proportional control $K_P$ on the removed result is added to the value obtained by removing the angular velocity $\dot{\theta}_L$ of rotation of the link from the angular velocity $\dot{\theta}_M$ of rotation of the motor and by performing the differential control $K_D$ on the removed result. The intended torque estimated value $\hat{\tau}$ is removed from the added result. Thereby, link torque $\tau_u$ is obtained. Consequently, the link $P_L(S)$ is driven by adding the link torque $\tau_u$ caused by the motor to an intended torque real value $\tau_h$ actually applied by the wearer.

In the disturbance observer, the angular velocity $\dot{\theta}_L$ of rotation of the link to which noise n is added is substituted into an inverse transfer function of the link, thereby obtaining an estimated value $\hat{\tau}$ of the link torque. The link torque $\tau_u$ is removed from the obtained result. The removed result is substituted into the Q filter, thereby obtaining an intended torque estimated value $\hat{\tau}$. The intended torque estimated value is fed back to the input of the motor again, and is used to calculate the final demand torque.

To describe the disturbance observer briefly, the disturbance observer is generally an algorithm that assumes a difference between the output based on a mathematical model of the system and the real output of the system to be a disturbance, and compensates for the input using the observed disturbance. If a modeling error of the system is not great, a controller that is robust against the disturbance can be designed by this disturbance compensation.

The typical disturbance observer compensates for unmodeled disturbance by observing a difference between the control input u and output y that are multiplied by an inverse function of the nominal model as the disturbance and causes this signal to pass through the Q filter and to be applied to the control input. Here, the Q filter is designed as a low pass filter to prevent noise of a measured signal and amplification of high-frequency input. An effect of the disturbance compensation is greatly dependent on an adjustment of an order or coefficient of the low pass filter used as the Q filter. As such, precise adjustment of the Q filter is required.

As a cutoff frequency of the Q filter becomes high, an effect of interrupting the disturbance increases. However, since there is a problem with the noise of the measured signal, there is a limitation to a settable frequency. As such, perfect interruption of the disturbance is actually impossible. Thus, it is necessary to have proper system modeling suitable for a desired problem phenomenon and a practical target of disturbance suppression.

According to the method and system for extracting intended torque for a wearable robot which have the above-mentioned structure, the friction of the driver is removed using the open-loop function without a separate force-torque sensor, and then the intended torque of the wearer can be extracted using the disturbance observer used for existing disturbance prediction.

Thus, according to the present disclosure, the friction torque and the intended torque can be calculated only by the rotary encoders of the motor and the link without an expensive heavy part such as a force-torque sensor. The friction torque and the intended torque are reflected on the system, and thereby the wearable robot can be controlled so as to be more stable and fit for its intended purpose. That is, the intended torque is estimated and subjected to positive feedback. Thus, the motor is driven as intended by the wearer, and thereby the robot can be operated.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A system for extracting intended torque for a wearable robot comprising:
   a motor sensor measuring an angle or angular velocity of rotation of a motor driving a joint;
   a link sensor measuring an angle or angular velocity of rotation of a link connected to the joint; and
   a controller configured to adopt the angular velocity of rotation of the motor as an input and an estimated value of frictional torque as an output, input motor torque calculated from the angular velocity of rotation of the motor and the angular velocity of rotation of the link into a disturbance observer, calculate an estimated value of the intended torque applied by a wearer, perform a motor controlling process of adding the intended torque estimated value to demand torque, remove a friction torque estimated value from the added result, obtain fixed demand torque, and control the motor according to the fixed demand torque.

2. A method of extracting intended torque for a wearable robot, in which an angle or angular velocity of rotation of a motor driving a joint and an angle or angular velocity of rotation of a link connected to the joint are used, the method comprising:
   a controller of a robot performing a friction outputting process of outputting an estimated value of friction torque from the angle of rotation of the motor;
   the controller of the robot performing a motor torque calculating process of calculating motor torque from the angular velocity of rotation of the motor;
   the controller of the robot performing a link rotation calculating process of calculating the angular velocity of rotation of the link;
   the controller of the robot performing an intended torque calculating process of inputting the motor torque and the angular velocity of rotation of the link into a disturbance observer, and calculating an estimated value of the intended torque applied by a wearer; and
   the controller of the robot performing a motor controlling process of adding the intended torque estimated value to demand torque, removing a friction torque estimated value from the added result, obtaining fixed demand torque, and controlling the motor according to the fixed demand torque.

3. The method according to claim 2, wherein the motor torque calculating process includes adding a component, which is obtained by removing the angle of rotation of the link from the angle of rotation of the motor and by performing proportional control on the removed result, to a component, which is obtained by removing sensor noise from the angular velocity of rotation of the motor and by performing differential control on the removed result, removing the intended torque estimated value from the added result, and calculating the motor torque.

4. The method according to claim 2, wherein the intended torque calculating process includes multiplying the angular velocity of rotation of the link by an inverse function of a nominal model of the link, calculating an estimated value of the motor torque, removing the motor torque from the calculated result, passing the removed result through a Q filter, and calculating the estimated value of the intended torque.

5. The method according to claim 2, wherein the friction outputting process includes calculating the estimated value of the friction torque using a function in which the angular velocity of rotation of the motor is set to an input and the estimated value of the friction torque is set to an output.

6. The method according to claim 5, wherein the function is configured by a sum of coulomb friction torque, a product of viscosity friction torque and the angular velocity of rotation of the motor, and a product of static friction force and a signum value of the angular velocity of rotation of the motor.

* * * * *